United States Patent [19]

Cherek et al.

[11] Patent Number: 5,347,495
[45] Date of Patent: Sep. 13, 1994

[54] MATCHING TRANSFORMER FOR ULTRASONIC TRANSDUCER

[75] Inventors: Bogdan Cherek; Son C. Nguyen; Andy Adams, all of Peterborough, Canada

[73] Assignee: Milltronics Ltd., Peterborough, Canada

[21] Appl. No.: 54,141

[22] Filed: Apr. 30, 1993

[51] Int. Cl.$^5$ .............................................. G01S 15/00
[52] U.S. Cl. ...................................... 367/87; 367/903; 333/32
[58] Field of Search ...................... 367/87, 137, 903; 333/32; 73/632; 336/182; 310/316, 317, 319

[56] References Cited

U.S. PATENT DOCUMENTS

| | | | |
|---|---|---|---|
| 3,102,991 | 9/1963 | Jess | 367/87 |
| 3,613,068 | 10/1971 | Thompson | 367/191 |
| 4,114,457 | 9/1978 | Thun | 73/632 |
| 4,199,246 | 4/1980 | Muggli | 354/195.1 |
| 4,326,273 | 4/1982 | Vancha | 367/112 |
| 4,336,605 | 6/1982 | Vancha | 367/105 |
| 4,353,004 | 10/1982 | Kleinschmidt | 310/318 |
| 4,597,068 | 6/1986 | Miller | 367/87 |
| 4,626,728 | 12/1986 | Flachenecker et al. | 310/316 |
| 4,701,893 | 10/1987 | Muller et al. | 367/87 |
| 4,785,429 | 11/1988 | Folwell et al. | 367/98 |
| 5,151,085 | 9/1992 | Sakurai et al. | 310/316 |

FOREIGN PATENT DOCUMENTS 58-206989 12/1983 Japan.

*Primary Examiner*—Ian J. Lobo
*Attorney, Agent, or Firm*—Ridout & Maybee

[57] ABSTRACT

A transformer used to connect an electro-acoustic transducer to a transmitter and a receiver in a pulse-echo ranging system has a first winding connected to the transducer, and second and third windings connected in parallel to the transmitter and the receiver. The second winding has back-to-back diodes in series with it, and the third winding has several times more turns than the second winding, so that with high amplitude signals, as during transmission, the diodes conduct and render the second winding effective. With low amplitude signals, as during reception, the diodes isolate the second winding and the third winding acts to provide a relative step-up of the amplitude of the received signals.

4 Claims, 1 Drawing Sheet

MATCHING TRANSFORMER FOR ULTRASONIC TRANSDUCER

BACKGROUND OF THE INVENTION

1. Field of the Invention

This invention relates to pulse-echo acoustic ranging systems of the type in which a transmitter generates pulses of high frequency electrical energy at a predetermined frequency to cause an electro-acoustic transducer to generate shots of acoustic energy, and the same transducer is utilized to receive acoustic energy echoed from a target and convert such energy into electrical signals which are applied to a receiver.

2. Review of the Art

For effective operation of such a system both the transmitter and the receiver must be effectively matched to the transducer, and the input of the receiver must also be protected from high amplitude signals appearing at the output of the transmitter, which signals will be of much higher amplitude than the signals due to echoing of the transmitted acoustic energy. Since the piezo-electric transducers typically utilized are reactive devices, it is common to use transformers or other inductive components in the matching circuits to achieve some degree of tuning of the transducer to its operating frequency, thus increasing the Q or quality factor of the circuit. In this respect, circuit requirements tend to be different in different phases of operation. Whilst transmitter efficiency is favoured by a high Q, too high a Q results in delays in both the build up of amplitude of the "shot" of acoustic energy produced and, more importantly, extended high amplitude "ringing" of the transducer after cessation of the transmitter pulse. This ringing tends to limit the minimum range at which a target can be detected, and causes various difficulties in the recognition of echo signals reflected from a target. On the other hand, effective detection of weak and noisy long range echo signals is favoured by good impedance and noise matching to the receiver, although this is less important in the case of relatively high amplitude short range echo signals.

Various approaches to these problems have been proposed or used.

U.S. Pat. No. 3,613,068 (Thompson et al) utilizes separate receiver and transmitter transformers, with primary and secondary windings respectively connected in series with one another and with the transducer, the receiver winding being in parallel with back-to-back diodes, and a tertiary winding being provided on the transmitter transformer which shorts out the transmitter transformer secondary winding except during a transmit pulse. During a transmit pulse, the diodes limit the potential appearing across the primary of the receiver transformer, and also effectively take the receiver transformer out of circuit so far as the transmitter is concerned. The circuit requires two separate transformers, and a switching circuit for the transmitter transformer secondary. Since this switching circuit is controlled by the signal amplitude in the transmitter transformer, ringing of the transducer must result in some uncertainty as to point at which the relay performing the switching will drop out and remove the transmitter transformer secondary from the transducer circuit.

U.S. Pat. No. 4,199,2464 (Muggli) utilizes a single transformer connected to the transmitter, with the receiver signal being taken from a tap on the secondary of the transmitter transformer, which forms part of a variable Q filter. It is a feature of the Muggli patent that a frequency-varying pulse is utilized, and the variable Q filter permits the bandwidth of the circuit to be increased and its Q lowered during transmission and the receiving of short range echoes, and the bandwidth to be narrowed and the Q increased while receiving longer range echoes, under control of an external control circuit.

U.S. Pat. No. 4,785,429 (Folwell et al) utilizes back-to-back diodes in series with a winding of a transformer, in turn in series with a transducer, with a feedback circuit providing variable bias at the input to a receiver.

U.S. Pat. No. 4,701,893 (Muller et al) connects a transmitter and a receiver to different windings of a transformer, and utilizes a blanking signal to apply heavy damping to the transmitter winding following a pulse.

U.S. Pat. No. 4,597,068 (Miller) utilizes a common inductor for both transmission and reception, and controls a transmit pulse by energizing first a positive feedback amplifier and then a negative feedback amplifier to introduce and then remove energy from the inductive circuit.

U.S. Pat. No. 4,326,273 (Vancha) utilizes separate transmit and receive transformers, with back-to-back diodes connected in parallel with the secondary of the receive transformer through a potentiometer. The secondary of the transmit transformer and the primary of the receive transformer are connected in parallel, and the primary of the transmit transformer is only in circuit during transmission of the pulse.

U.S. Pat. No. 4,353,004 (Kleinschmidt) utilizes a pair of back-to--back diodes to shunt out part of a series resonant circuit during a transmit pulse, thus preventing it from short-circuiting the transducer, whilst the diodes cease to conduct during reception of low amplitude received signals, thus permitting the series resonant circuit to be functional to enhance efficiency during reception.

U.S. Pat. No. 4,114,467 (Thun) discloses, in FIG. 3, the use of a transformer having separate transmitter and receiver windings. Diodes associated with the receiver winding are switching diodes utilized to isolate the receiver during a blanking period. The transmitter and receiver windings are connected neither in series nor in parallel.

Japanese Published Application 58-206989 utilizes a varicap diode in a tuned input circuit to a receiver so that this circuit is detuned by high amplitude signals, thus reducing transfer of signals to the receiver input.

SUMMARY OF THE INVENTION

It is an object of the present invention to provide a transformer for matching a piezo-electric electro-acoustic transducer in a pulse-echo acoustic ranging system to both a transmitter and a receiver which is simple in construction yet adjusts matching during different phases of operation of the system in a fully automatic manner without the necessity for external control.

The environment in which the invention is implemented is a transceiver circuit for a pulse-echo acoustic ranging device comprising a transmitter generating pulses of electrical energy at a predetermined operating frequency, an electro-acoustic piezo-electric transducer operating at the predetermined frequency for transducing the pulses into shots of acoustic energy and transducing echoed acoustic energy into electrical energy, a receiver for receiving and amplifying electric signals transduced by the transducer from echoed acoustic energy, and a transformer having windings connected to said transmitter, said receiver and said transducer.

According to the invention, the transformer has a first winding connected to the transducer and acting as a secondary winding in respect of the transmitter and a primary winding in respect of the receiver, a second winding connected to both the transmitter and the receiver and acting as a secondary winding in respect of the receiver, a third winding in series with a pair of back-to-back diodes, the third winding and the diode pair being connected, in parallel with the second winding, to the transmitter and the receiver, the third winding acting as a primary winding in respect of said transmitter and being of much lower inductance than the second winding, and a connection of the second and third windings at least to the transmitter includes series capacitance such as to provide series resonance of the circuit at a frequency close to the predetermined operating frequency when the transmitter is active.

SHORT DESCRIPTION OF THE DRAWINGS

FIG. 1 is a schematic diagram of relevant portions of a pulse-echo ranging system incorporating the invention.

DESCRIPTION OF THE PREFERRED EMBODIMENT

Figure 1:
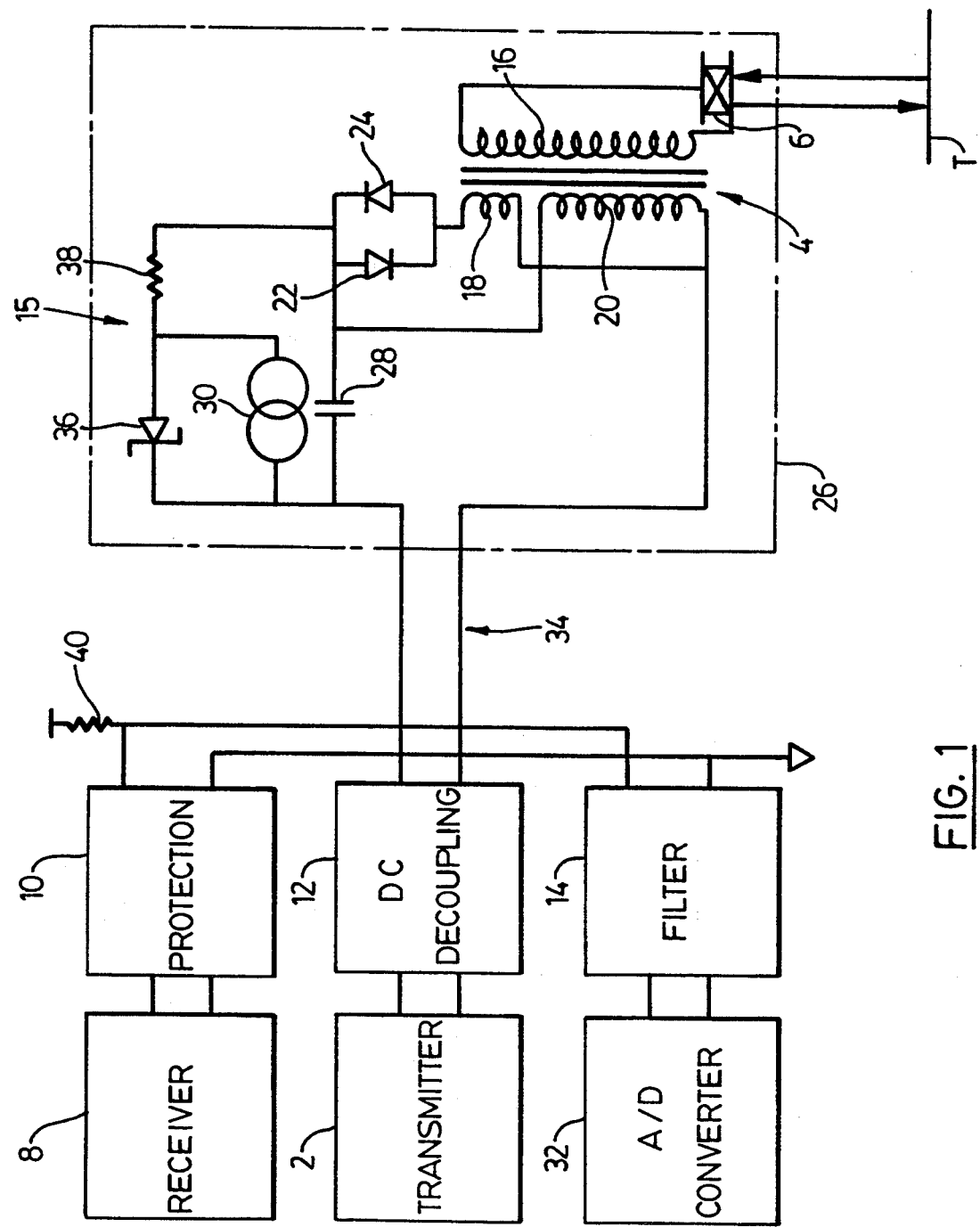

The ranging system shown in FIG. 1 includes a transmitter 2, typically consisting of a single-ended or push-pull driver circuit switching a current supply on and off at a repetition rate such as to provide a desired operating frequency for the duration of a transmit pulse. A transformer 4 couples the transmitter 2 to a piezoelectric transducer 6, active elements of the latter typically being of sandwich construction- The transducer is tuned to resonate at or near the operating frequency, and converts high frequency electrical energy from the transmitter into acoustic energy directed towards a target T. A receiver 8 receives electrical energy converted by the transducer from acoustic energy echoed from the target. The transformer 4 is a matching transformer coupling the transmitter, the receiver and the transducer. Since the transmitter output is coupled to the receiver input, the receiver is protected against the application of excessive signals during a transmit pulse by protection circuit 10. This may be implemented by oppositely biased diodes acting in conjunction with a limiting resistor, but more preferably by a fast acting electrically controlled switch which isolates the receiver input during a transmit pulse. Such a switch enables the limiting resistor to be eliminated, avoiding the loss of signal associated with such a resistor, and allowing for better noise .and impedance matching to the transducer.

The transformer 4 has three windings, a first winding 16 which acts both as a secondary winding during a transmit pulse and a primary winding during echo reception. Second and third windings 18 and 20 act respectively as a primary winding for the transmitter and a secondary winding for the receiver. Back-to--back diodes 22, 24 are connected in series with the winding 18, which has a much lower inductance than the winding 20 by virtue of having more turns, preferably by a factor of at least 3 or 4. Assuming for example an operating frequency in the range 10–50 kHz, the winding 18 could have an inductance of about 0.3 millihenries, while the winding 20 could have an inductance of about 1.1 millihenries.

A capacitor 28 is arranged in series with the output of the transmitter (and in this case also the input to the receiver) to form, with the winding 18 (and also the parallel winding 20) and the transducer 6, a circuit having a series resonance at a frequency close to the frequency at which the transducer is operated. The characteristics of the transducer during transmission can be controlled to some extent by adjustment of the series resonance, and it has been found that with the improved matching which is possible to the transmitter, a self-cleaning effect can be achieved at the radiating face of the transducer which is valuable in dusty environments. Since the velocity of sound in air and other gaseous mediums is substantially temperature dependent, a temperature sensor is usually associated with a transducer used for pulse-echo ranging applications. We have found that by placing the transformer 4, capacitor 28 and diodes 22, 24 within a common housing 26, it is possible also to sense temperature over the same two wire connection 34 that is used to connect the assembly to the remainder of the apparatus. To this end a temperature sensor circuit 15 is provided forming a high impedance leakage path in parallel with the capacitor 28.

In a preferred arrangement, the temperature sensing element 30 is a current source device such as the AD592 device from Analog Devices. In order to protect the element 30 against overvoltage, it is placed in parallel with a zener diode 36 and in series with a limiting resistor 38. A reference potential is applied to the circuit through a resistor 40, and potential developed across the sensor circuit is sampled, whilst the transmitter is inactive, by an analog-to-digital converter 32, whose input is protected from the transmit pulses by a filler 14 having an input impedance high enough to avoid loading the transmitter or receiver. A DC decoupling circuit 12 is provided at the output of the transmitter to avoid shunting the temperature sensing circuit. Decoupling may be effected by a large value capacitor, but since decoupling is required only when a transmit pulse is not present, and since the charge held by such a capacitor can present problems in circuit design and performance, the use of a zener diode for decoupling is preferred. The temperature sensing circuit could be provided by a thermistor, but the use of a current source is believed to provide more stable performance.

In operation, pulses of high frequency electrical energy from the transmitter have a peak-to-peak amplitude sufficient that the effect of the diodes 22 and 24 is essentially negligible. The inductance of the winding 20 is so much higher than that of the winding 18 that only a very small proportion of the primary current in the transformer passes through the latter, the effect of the transformer being governed by the turns ratio of the windings 18 and 16, which will normally be such as to step up the potential applied to the transducer 6.

When echo signals are being received, the peak-to-peak amplitude of the received signals appearing in the winding 18 will normally be insufficient to cause the diodes 22 and 24 to conduct, and thus the signals applied to the receiver will be generated solely by the winding 20. Since this winding has many more turns than the winding 18, the peak-to-peak amplitude of the signals will also be correspondingly higher across this winding, and it should be possible to obtain better impedance and noise matching to the receiver input than would be possible with a winding optimized for coupling the transmitter to the transducer. In the case of very high amplitude received signals, the diodes 22 and 24 will begin to conduct, applying attenuation according to an approximately logarithmic law characteristic of the threshold characteristics of semiconductor diodes.

I claim:

1. In a transceiver circuit for a pulse-echo acoustic ranging device comprising a transmitter generating pulses of electrical energy at a predetermined operating frequency, an electro-acoustic piezo-electric transducer operating at said predetermined frequency for transducing said pulses into shots of acoustic energy and transducing echoed acoustic energy into electrical energy, a receiver for receiving and amplifying electric signals transduced by said transducer from echoed acoustic energy, and a transformer having windings connected to said transmitter, said receiver and said transducer, the improvement wherein:

the transformer has a first winding connected to the transducer and acting as a secondary winding in respect of the transmitter and a primary winding in respect of the receiver, a second winding connected to both the transmitter and the receiver and acting as a secondary winding in respect of the receiver, a third winding in series with a pair of back-to-back diodes, the third winding and the diode pair being connected, in parallel with the second winding, to the transmitter and the receiver, the third winding acting as a primary winding in respect of said transmitter and being of much lower inductance than the second winding, and a connection of the second and third windings at least to the transmitter includes series capacitance such as to provide series resonance of the circuit at a frequency close to the predetermined operating frequency when the transmitter is active.

2. A transceiver circuit according to claim 1, further including a high impedance temperature sensing circuit in parallel with said series capacitance such as to provide a path for direct current through said second winding which has a resistance which is essentially that of the temperature sensing circuit, whereby the temperature of the circuit may be sensed, the temperature sensing circuit, the capacitance, the transformer and the transducer being located in a common housing.

3. A transceiver circuit according to claim 2, wherein the temperature sensing circuit includes a current source device.

4. A transceiver circuit according to claim 1, wherein the second and third winding have a turns ratio of about 3 to 4:1.

* * * * *